United States Patent
Inoue

(10) Patent No.: US 12,281,206 B2
(45) Date of Patent: Apr. 22, 2025

(54) POLYROTAXANE COMPRISING LONG-CHAIN ALKYL GROUP IN CYCLIC MOLECULE, COMPOSITION COMPRISING SAID POLYROTAXANE, AND METHOD FOR PRODUCING SAID POLYROTAXANE

(71) Applicant: ASM INC., Ibaraki (JP)

(72) Inventor: Katsunari Inoue, Kashiwa (JP)

(73) Assignee: ASM INC., Ibaraki (JP)

( * ) Notice: Subject to any disclaimer, the term of this patent is extended or adjusted under 35 U.S.C. 154(b) by 724 days.

(21) Appl. No.: 17/619,346

(22) PCT Filed: Jun. 18, 2020

(86) PCT No.: PCT/JP2020/023897
§ 371 (c)(1),
(2) Date: Dec. 15, 2021

(87) PCT Pub. No.: WO2020/256046
PCT Pub. Date: Dec. 24, 2020

(65) Prior Publication Data
US 2022/0235182 A1 Jul. 28, 2022

(30) Foreign Application Priority Data
Jun. 19, 2019 (JP) ................................ 2019-113431

(51) Int. Cl.
C08G 83/00 (2006.01)
C08B 37/16 (2006.01)
C08L 83/04 (2006.01)

(52) U.S. Cl.
CPC ........ *C08G 83/007* (2013.01); *C08B 37/0015* (2013.01); *C08L 83/04* (2013.01)

(58) Field of Classification Search
CPC .... C08G 83/007; C08B 37/0015; C08L 83/04
See application file for complete search history.

(56) References Cited

U.S. PATENT DOCUMENTS

2009/0312492 A1 12/2009 Ruslim et al.
2017/0096559 A1 4/2017 Nakai et al.

FOREIGN PATENT DOCUMENTS

| EP | 3064513 A1 | 9/2016 |
| JP | 2007099994 A | 4/2007 |
| JP | 2017-66318 | 4/2017 |
| JP | 2019-1990 A | 1/2019 |
| WO | 03/074099 A1 | 12/2003 |
| WO | 2005/095493 A1 | 10/2005 |
| WO | 2008/108411 A1 | 9/2008 |
| WO | 2013/061988 A1 | 2/2013 |

OTHER PUBLICATIONS

International Search Report mailed Sep. 1, 2010, issued in corresponding Application No. PCT/JP2020/023897, filed Jun. 18, 2020, 2 pages (English Translation).
EP Search Report for EP Pat. App. No. 20826370.7. 8 pages.
Saki, Yasuhiro et al. "Structure and dynamics of polyrotaxane-based sliding graft copolymers with alkyl side chains," Soft Matter, vol. 9, No. 6, Jan. 1, 2013. pp. 1895-1901. 7 pages.
Sakai Yasuhiro et al, "Electronic Supplementary Information: Structure and Dynamics of Polyrotaxane-based Sliding Graft Copolymers with Alkyl Side Chains", Soft Matter, (Dec. 19, 2012), URL: https://www.rsc.org/suppdata/sm/c2/c2sm27047a/c2sm27047a.pdf.
International Preliminary Examination Report mailed Sep. 1, 2020, issued in corresponding Application No. PCT/JP2020/023897, filed Jun. 18, 2020, 4 pages.

*Primary Examiner* — Ling Siu Choi
*Assistant Examiner* — Andrea Wu
(74) *Attorney, Agent, or Firm* — CHRISTENSEN O'CONNOR JOHNSON KINDNESS PLLC

(57) ABSTRACT

The present invention provides a polyrotaxane of high compatibility with silicones, such as silicone oil, a highly insulative polyrotaxane, and/or a material comprising said polyrotaxane. The present invention provides a polyrotaxane obtained by disposing blocking groups at both ends of a pseudopolyrotaxane, in which the opening in a cyclic molecule is clathrated in a skewered manner by a straight-chain molecule, so that the cyclic molecule does not escape, wherein the cyclic molecule comprises a first group represented by formula I (in formula I, X is a single bond or NH; n is 0 or 1; R is a straight-chain, branched, or cyclic alkyl group, alkenyl group, or alkynyl group comprising 12-20 carbon atoms, with some of the hydrogen in the alkyl group, alkenyl group, or alkynyl group being optionally substituted by an OH group, a CN group, or an $NH_2$ group; and * is the position of the bond to the cyclic molecule).

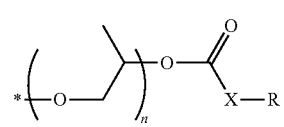

I

12 Claims, No Drawings

POLYROTAXANE COMPRISING LONG-CHAIN ALKYL GROUP IN CYCLIC MOLECULE, COMPOSITION COMPRISING SAID POLYROTAXANE, AND METHOD FOR PRODUCING SAID POLYROTAXANE

TECHNICAL FIELD

The present invention relates to a polyrotaxane comprising a long chain alkyl group and the like in a cyclic molecule(s), a composition comprising the polyrotaxane, a crosslinked body comprised of the polyrotaxane, a method for producing the polyrotaxane, and a method for producing the crosslinked body.

BACKGROUND ART

A polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), has been expected to be used in various materials, since the materials can have excellent elongation, excellent flexibility and the like.

In order to utilize the characteristics of the polyrotaxane, a hydroxyl group(s) of a cyclic molecule(s), for example, α-cyclodextrin(s) (hereinafter, may be simply abbreviated as "α-CD(s)") in the polyrotaxane is modified with each modification group(s) to improve the compatibility with a solvent or impart functionality in various reports.

For example, Patent Document 1 discloses a polyrotaxane in which hydroxyl groups of cyclic molecules α-CDs in the polyrotaxane are modified with (i) an acyl group, and (ii) a group(s) selected from the group consisting of an alkyloxy group, an alkyloxy group, an alkylcarbonate group, an alkylcarbamoyl group, a silyl group, and a photoreactive group. It is also disclosed that the modified polyrotaxane has improved solubility in various solvents.

Further, Patent Document 2 discloses a modified polyrotaxane in which a hydroxypropyl group(s) is bonded to a hydroxyl group(s) of α-CD(s) in the polyrotaxane, and a part of or all of the hydroxyl groups are modified with an ε-caprolactone-derived modification group(s), and the terminal hydroxyl group(s) of the caprolactone-derived modification group(s) is further modified with a hydrocarbon group(s) having a C3-29 alicyclic structure. It is also disclosed that the modified polyrotaxane has an improved rate of compatibility with polypropylene glycol.

More, Patent Document 3 discloses a composition containing a polyrotaxane, a polysiloxane-containing block copolymer, and a polymer free of polysiloxane, and that an elastomer prepared from the composition exhibits excellent moisture resistance. Furthermore, the polyrotaxane specifically disclosed in Patent Document 3 has a polycaprolactone side chain(s).

PRIOR ART DOCUMENT

Patent Document

Patent Document 1: WO2008/108411.
Patent Document 2: JP-A-2019-1990.
Patent Document 3: JP-A-2017-66318.

DISCLOSURE OF THE INVENTION

Problems to be Solved by the Invention

However, none of the above-mentioned Patent Documents 1 to 3 discloses the modified polyrotaxane which is compatible with silicones.

For example, Patent Document 1 does not at all disclose the modified polyrotaxane in Patent Document 1, that is compatible with silicones.

Further, Patent Document 2 discloses that the compatibility of the modified polyrotaxane in Patent Document 2 with polypropylene glycol is improved in the presence of a solvent, but is silent on the compatibility with silicones.

More, Patent Document 3 discloses a block copolymer containing a polyrotaxane having a polycaprolactone side chain(s) and polysiloxane. However, when non-copolymerized polysiloxane is used, it is found that the modified polyrotaxane is not compatible with silicones, as disclosed in Comparative Example 2 of Patent Document 3.

On the other hand, there is a demand for a highly concentrated polyrotaxane compatible with silicones. If such a polyrotaxane can be provided, it is possible to provide a material having excellent elastic properties, for example, a desired Young's modulus and/or a desired hysteresis loss, and it is also possible to provide a material exhibiting a high insulating property.

An object of the present invention is to provide a polyrotaxane having high compatibility with silicones, such as silicone oil.

Further, an object of the present invention is, other than or in addition to the above object, to provide a polyrotaxane having a high insulation or a material comprised of the polyrotaxane.

More, an object of the present invention is, other than or in addition to the above objects, to provide a method for producing the above polyrotaxane.

Further, an object of the present invention is, other than or in addition to the above objects, to provide a composition comprising the above polyrotaxane, a crosslinked body comprised of the above polyrotaxane, and a method for producing the crosslinked body.

In order to achieve the above objects, the present inventor has found the following inventions:

<1> A polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises a first group represented by following formula I, wherein X represents a single bond or NH;
n represents 0 or 1;
R represents a linear, branched or cyclic alkyl group, alkenyl group or alkynyl group having 12 to 20 carbon atoms (a part of hydrogens in the alkyl group, alkenyl group or alkynyl group are substituted with an OH group(s), a CN group(s) or an NH$_2$ group(s)); and
* represents the position bound to the cyclic molecule,

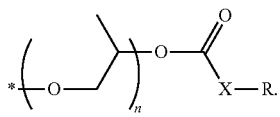

I

<2> In the above item <1>, the cyclic molecule(s) may comprise a hydroxyl group(s), and a part of the hydroxyl group(s) may be substituted with the first group(s), wherein 20 to 80%, preferably 25 to 75%, more preferably 30 to 70%, most preferably 40 to 60% of the hydroxyl group(s) may be substituted with the first group(s) in a case where an amount of the hydroxyl group(s) before substitution is 100%.

<3> In the above item <1> or <2>, the polyrotaxane may comprise a hydroxyl group(s), and the polyrotaxane may have a hydroxyl value of 60 to 300 mgKOH/g, preferably 70 to 250 mgKOH/g, more preferably 80 to 200 mgKOH/g, most preferably 90 to 150 mgKOH/g.

<4> A composition comprising:
(A) the polyrotaxane described in any one of the above items <1> to <3>; and
(B) a first compound comprising a polysiloxane structure.

<5> In the above item <4>, in a case where the total weight of the (A) polyrotaxane and the (B) first compound is 100 parts by weight, the (A) polyrotaxane may have 3 to 70 parts by weight, preferably 5 to 60 parts by weight, more preferably 8 to 55 parts by weight in the 100 parts by weight.

<6> In the above item <4> or <5>, the (B) first compound may comprise a hydroxyl group(s).

<7> In any one of the above items <4> to <6>, the (B) first compound may comprise a polydimethylsiloxane structure.

<8> A crosslinked body formed from the composition described in any one of the above items <4> to <7>.

<9> In the above item <8>, in a case where the total weight of the (A) polyrotaxane and the (B) first compound is 100 parts by weight, the (A) polyrotaxane may have 3 to 70 parts by weight, preferably 5 to 60 parts by weight, more preferably 8 to 55 parts by weight in the 100 parts by weight.

<10> A substance comprising the crosslinked body described in the above item <8> or <9>.

<11> A method for producing a polyrotaxane comprising the steps of:
(I) preparing a polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises (1) a hydroxyl group(s) or (2) a hydroxypropyl group(s);
(II) preparing a second compound, which is one selected from the group consisting of RCOOH, RCOCl and RNCO, wherein R represents a linear, branched or cyclic alkyl group, alkenyl group or alkynyl group having 12 to 20 carbon atoms (a part of hydrogens in the alkyl group, alkenyl group or alkynyl group are substituted with an OH group(s), a CN group(s) or an NH$_2$ group(s));
(III) reacting the polyrotaxane prepared in the step (I) and the second compound prepared in the step (II);
thereby to produce the polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s),
wherein the cyclic molecule comprises a first group represented by following formula I,
wherein X represents a single bond or NH;
n represents 0 or 1;
R represents a linear, branched or cyclic alkyl group, alkenyl group or alkynyl group having 12 to 20 carbon atoms (a part of hydrogens in the alkyl group, alkenyl group or alkynyl group are substituted with an OH group(s), a CN group(s) or an NH$_2$ group(s)); and
* represents the position bound to the cyclic molecule,

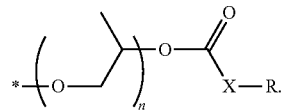

I

<12> The cyclic molecule in the step (I) of the above <11> may comprise the (1) hydroxyl group(s) and/or a hydroxyl group(s) derived from the (2) hydroxypropyl group(s), and in a case where an amount of the hydroxyl group(s) is 100%, 20 to 80%, preferably 25 to 75%, more preferably 30 to 70%, most preferably 40 to 60% of the hydroxyl group(s) may be substituted with the first group(s) in the polyrotaxane obtained after the step (III).

<13> A method for producing a crosslinked body comprising the steps of:
(X) preparing a (A) polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises a first group represented by following formula I,
wherein X represents a single bond or NH;
n represents 0 or 1;
R represents a linear, branched or cyclic alkyl group, alkenyl group or alkynyl group having 12 to 20 carbon atoms (a part of hydrogens in the alkyl group, alkenyl group or alkynyl group are substituted with an OH group(s), a CN group(s) or an NH$_2$ group(s)); and
* represents the position bound to the cyclic molecule,

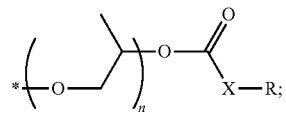

I (XI) preparing a (B) first compound comprising a polysiloxane structure;
(XII) reacting the (A) polyrotaxane and the (B) first compound, for example, under the conditions of:
temperature: from room temperature to 150; pressure: normal pressure;
thereby to produce the crosslinked body formed from the (A) polyrotaxane; and the (B) first compound.

Effects of the Invention

The present invention can provide a polyrotaxane having high compatibility with silicones, such as silicone oil.

Further, the present invention can provide, other than or in addition to the above effect, a polyrotaxane having a high insulation or a material comprised of the polyrotaxane.

More, the present invention can provide, other than or in addition to the above effects, a method for producing the above polyrotaxane.

Further, the present invention can provide, other than or in addition to the above effects, a composition comprising the above polyrotaxane, a crosslinked body comprised of the above polyrotaxane, and a method for producing the crosslinked body.

EMBODIMENTS FOR CARRYING OUT THE INVENTION

Hereinafter, the present invention described herein will be described in detail.

The present invention provides a polyrotaxane comprising a long chain alkyl group and the like in a cyclic molecule(s), a composition comprising the polyrotaxane, a crosslinked body comprised of the polyrotaxane, a method for producing the polyrotaxane, and a method for producing the crosslinked body. Hereinafter, the present invention will be described in detail in order.

<Polyrotaxane Comprising a Long Chain Alkyl Group and the Like in a Cyclic Molecule(s)>

The present invention provides a polyrotaxane comprising a long chain alkyl group and the like in a cyclic molecule(s). Specifically, the present invention provides a polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises a first group represented by the above-described formula I, wherein X represents a single bond or NH;

n represents 0 or 1;

R represents a linear, branched or cyclic alkyl group, alkenyl group or alkynyl group having 12 to 20 carbon atoms (a part of hydrogens in the alkyl group, alkenyl group or alkynyl group are substituted with an OH group(s), a CN group(s) or an $NH_2$ group(s)); and

* represents the position bound to the cyclic molecule.

In above-described formula I, R may represent a linear, branched or cyclic alkyl group, alkenyl group or alkynyl group, preferably a linear alkyl group, a linear alkenyl group, or a linear alkynyl group, more preferably a linear alkyl group or a linear alkenyl group having preferably 11 to 18, more preferably 12 to 17, preferably 14 to 16 carbon atoms.

Specifically, the first group may have X being single bond, n being 1, R being an alkyl group having 14 to 16 carbon atoms.

The cyclic molecule(s) may comprise a hydroxyl group(s), and a part of the hydroxyl group(s) may be substituted with the first group(s), wherein 20 to 80%, preferably 25 to 75%, more preferably 30 to 70%, most preferably 40 to 60% of the hydroxyl group(s) may be substituted with the first group(s) in a case where an amount of the hydroxyl group(s) before substitution is 100%.

The cyclic molecule(s) of the polyrotaxane according to the present invention may have a first functional group capable of reacting with other material, other than the first group. The first functional group may include a hydroxyl group, an amino group, a thiol group, a carboxylic acid group, an acid anhydride group, an epoxy group, and the like. In particular, the first functional group may have a hydroxyl group. In a case where the polyrotaxane according to the present invention, in particular, the cyclic molecule of the polyrotaxane according to the present invention comprises a hydroxyl group(s), and a hydroxyl value may be 60 to 300 mgKOH/g, preferably 70 to 250 mgKOH/g, more preferably 80 to 200 mgKOH/g, most preferably 90 to 150 mgKOH/g.

The "cyclic molecule", the "liner molecule", and "capping group", each of which constitutes the polyrotaxane, will be described hereinafter. Furthermore, conventionally known material may be used for them.

<<Cyclic Molecule>>

The cyclic molecule of the polyrotaxane according to the present invention is not limited as long as the cyclic molecule may be cyclic, and may have a cavity, and a linear molecule is included in the cavity (cavities) of the cyclic molecules in a skewered manner.

The cyclic molecule comprises a first group via an optional linking group. Furthermore, examples of the linking group may include, but are not limited to, —$CH_2$—$CH_2$—, —$CH_2$—$CH_2$—$CH_2$—, —$CH_2$—$CH(OH)$—$CH_2$—, —$CH_2$—$CH_2$—$CH_2$—$CH_2$—, —$CO$—$CH_2$—$CH_2$—, —$CO$—$C(CH_3)_2$—$CH_2$—, —$CO$—$CH(OH)$—$CH_2$—, —$CO$—$CH_2$—$CH_2$—$CH_2$—$CH(CH_3)$—, and the like.

The cyclic molecule may comprise a group(s) other than the above-described first group. For example, the group(s) other than the above-described first groups may be, but are not limited to, an acetyl group, a propionyl group, a butyl ester group, a methoxy group, a propyl ether group, a butyl ether group, a butyl carbamoyl group, a cyclohexyl carbamoyl group, a hydroxyethyl group, a hydroxypropyl group, a hydroxybutyl group, a 2,3-dihydroxypropyl group, a phenyl group, a benzyl carbamoyl group, a phenyl ethyl carbamoyl group, a benzyl ester group, butyl benzyl ester group and the like.

The cyclic molecule may be, for example, selected from the group consisting of α-cyclodextrin, β-cyclodextrin and γ-cyclodextrin.

For example, a part of —OH groups in α-cyclodextrin and the like may be substituted with the above-described first group. Furthermore, a part of —OH groups in α-cyclodextrin and the like may be substituted with the above-described group other than the first group.

<<Linear Molecule>>

The linear molecule of the polyrotaxane according to the present invention is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadienestyrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. In particular, the linear molecule may be polyethylene glycol.

A weight average molecular weight of the linear molecule may be 1,000 or more, preferably 3,000 to 100,000, more preferably 6,000 to 50,000.

In the polyrotaxane of the present application, the combination of (cyclic molecule, linear molecule) may be (one derived from α-cyclodextrin, one derived from polyethylene glycol).

<<Capping Group>>

The capping group of the polyrotaxane according to the present invention is not limited, as long as the group is located at both ends of a pseudopolyrotaxane, and the group has a function of preventing dissociation of a cyclic molecule(s) from a linear molecule.

For example, the capping group may be selected from the group consisting of dinitrophenyl groups; cyclodextrins; adamantane groups; trityl groups; fluoresceins; silsequioxanes; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; silsequioxanes; and pyrenes, more preferably adamantane groups or cyclodextrins.

The polyrotaxane according to the present invention may comprise the first group represented by the above formula I, thereby to improve the compatibility with silicones.

<<Composition Comprising the Polyrotaxane According to the Present Invention>>

The present invention provides a composition comprising: (A) a polyrotaxane comprising a first group represented by the above-described formula I at the cyclic molecule.

In particular, the present invention provides a composition comprising: the above-described (A) component; and (B) a first compound comprising a polysiloxane structure.

Furthermore, the composition according to the present invention may comprise a component other than the above-described component (A); and the above-described component (B).

<<(B) First Compound Comprising a Polysiloxane Structure>>

A first compound (B) having a polysiloxane structure as included in the composition of the invention is not particularly limited as long as the compound has a polysiloxane structure.

The first compound may preferably have a hydroxyl group.

Further, the first compound may have a polydimethylsiloxane (PDMS) structure as a main component.

The first compound may have at least one second functional group in the main chain or side chain.

It is desirable that the first compound is a polysiloxane that is not block copolymerized with other oligomers or polymers.

Furthermore, examples of the second functional group may include, but are not limited to, a hydroxyl group, an amino group, a thiol group, a carboxylic acid group, an acid anhydride group, or an epoxy group.

Specifically, examples of the first compound (B) may include, but are not limited to, carbinol-terminated PDMS, bis(hydroxyethylamine)-terminated PDMS, silanol-terminated PDMS, PDMS in which a part of the side chains is modified with an OH group, vinyl-terminated PDMS, PDMS in which a part of the side chains is modified with a vinyl group, hydride-terminated PDMS, PDMS in which a part of the side chains is modified with a hydride, aminopropyl-terminated PDMS, PDMS in which a part of the side chains is modified with an aminopropyl group, epoxypropoxypropyl-terminated, modified PDMS, (meth)acryloxypropyl-terminated PDMS, succinic anhydride-terminated PDMS, carboxyalkyl-terminated PDMS, chloromethyl-terminated PDMS, or mercaptopropyl-terminated PDMS.

<<Component(s) Other than the Component (A); and the Component (B)>>

As described above, the composition according to the present invention may have a component(s) other than the above component (A); and the above component (B).

Examples of the component(s) may include, but are not limited to, (C1) a component having a reactive group capable of reacting with the above component (A) and/or the above component (B), and/or (C2) a polyol component free of a siloxane component.

Examples of the (C1) "reactive group" of the component having a reactive group that can react with the above component (A) and/or the above component (B) may include, but are not limited to, an isocyanate group, an acid anhydride group, a thioisocyanate group, an epoxy group, a carboxylic acid group, a carboxylic acid chloride, or an amino group.

The "reactive group" may preferably be an isocyanate group, a blocked isocyanate group, or an epoxy group, more preferably an isocyanate group or a blocked isocyanate group, and most preferably an isocyanate group.

Examples of the (C1) component comprising the reactive group capable of reacting with the above-described (A) components (A) and/or (B) may include, but are not limited to, a polyisocyanate compound or an isocyanate compound blocked therewith such as hexamethylene diisocyanate, phenylene diisocyanate, triethylene diisocyanate, isophorone diisocyanate, biuret-type polyisocyanate, isocyanurate-type polyisocyanate and adduct-type polyisocyanate; a diacid anhydride such as pyromellitic acid anhydride, 4,4'-carbonyldiphthalic acid anhydride, cyclohexanetetracarboxylic acid dianhydride, and 4,4'-oxydiphthalic acid anhydride; and a isocyanate compound of a polyfunctional acid chloride compound such as terephthaloyl dichloride, isophthaloyl dichloride and 1,3,5-benzenetricarbonyl trichloride; an amine compound such as ethylene diamine, hexamethylene diamine, diethylene triamine, m-xylylenediamine, and diamino diphenyl methane; a polyol comprising a terminated isocyanate group in which terminated hydroxyl group is modified with diisocyanate compound such as polypropylene glycol, polycarbonate diol, polyethylene glycol, and polysiloxane terminated with carbinol. Furthermore, in a case where the (C1) reactive group comprises an isocyanate group, the isocyanate group may be blocked with a compound such as ε-caprolactam, diethyl malonate, 2-butanone oxime, and dimethylpyrazole.

The (C2) polyol component free of a siloxane component refers to an oligomer or polymer polyol without a siloxane structure in its molecular structure. Specific examples thereof may include, but are not limited to, polyethylene glycol, polypropylene glycol, polytetramethylene glycol, polyester polyol, or polycarbonate polyol.

A component other than the above-described (C1) and (C2) may include, but are not limited to, polyrotaxanes other than the above-described polyrotaxane, polymers other than polyrotaxanes, monomers and oligomers forming the polymers, solvents, and the like.

Further, the component other than the above-described (C1) and (C2) may include various component in order that the crosslinked body formed from the composition according to the present invention may have desired characteristics. The component may include, but are not limited to, antioxidants, UV absorbers, crosslinking aids, surfactants, emulsifiers, plasticizers, polymerization initiators, polymerization inhibitors, polymer fine particles, metal oxides such as silica, alumina, and the like, surface conditioners, flame retardants and the like.

More, examples of the polymer other than polyrotaxane may include, but are not limited to, polyethers, polyesters, polycarbonates, polyacrylates, polyurethanes, polyureas, polysiloxanes, polyolefins, polyamides, polyamic acids, polyenes, polyvinyl ethers, or polyvinyl esters, or copolymers thereof, or modified compounds thereof.

Examples of the plasticizer may include, but are not limited to, dibutyl phthalate, di-2-ethylhexyl phthalate, butylbenzyl phthalate, dihexyl phthalate, dioctyl adipate, bis(2-ethylhexyl)adipate, tris(2-ethylhexyl)trimellitate, tricresyl phosphate or the like.

Examples of the UV absorber may include, but are not limited to, 2-ethylhexyl paradimethylaminobenzoate, 2-ethylhexyl salicylate, 2,4-dihydroxybenzophenone, 2-hydroxy-4-n-octylbenzophenone, 2-(2'-hydroxy-5'-t-butylphenyl) benzotriazole, bis(2,2,6,6-tetramethyl-4-piperidyl)-sebacate, 2-ethylhexyl paramethoxycinnamate, isopropyl paramethoxycinnamate, ethylhexyl methoxycinnamate, octyl methoxycinnamate or the like.

Examples of the photopolymerization initiator may include, but are not limited to, benzoylphosphine oxide compounds such as 2,4,6-trimethylbenzoyl-diphenyl-phosphine oxide (Lucirin (registered trademark) TPO); bisacylphosphine oxide compounds such as bis(2,4,6-trimethylbenzoyl)-phenylphosphine oxide (Irgacure (registered trademark) 819); or 1-hydroxyphenylketone such as 1-hydroxycyclohexylphenylketone (Irgacure (registered trademark) 184).

Examples of the thermal polymerization initiator may include, but are not limited to, organic peroxide-based polymerization initiators such as benzoyl peroxide, lauroyl peroxide, t-butylperoxyisobutyrate, t-butylperoxy-2-ethylhexanoate, t-butylperoxyneodecanoate, t-hexylperoxypivalate, diisopropylperoxydicarbonate, bis(4-t-butylcyclohexyl)peroxydicarbonate or the like; or azo-based polymerization initiators such as 2,2'-azobisisobutyronitrile, 2,2'-azobis(2,4-dimethylvaleronitrile), 2,2'-azobis(4-methoxy-2,4-dimethylvaleronitrile) or the like.

Examples of the solvent may include, but are not limited to, acetone, methyl ethyl ketone, toluene, xylene, ethyl acetate, butyl acetate, methanol, ethanol, isopropyl alcohol, water, dimethylformamide, dimethylacetamide, N-methylpyrrolidone, acetonitrile, a cellosolve-based solvent such as ethyl cellosolve or butyl cellosolve, or the like.

<<Crosslinked Body Formed from the Composition According to the Present Invention; and Substance Comprising the Crosslinked Body>>

The present invention provides a crosslinked body formed from the composition comprising: the (A) polyrotaxane; and the (B) first compound comprising a polysiloxane structure.

In the crosslinked body according to the present invention, the (A) polyrotaxane may have 3 to 70 parts by weight, preferably 5 to 60 parts by weight, more preferably 8 to 55 parts by weight in the 100 parts by weight, in a case where the total weight of the (A) polyrotaxane and the (B) first compound is 100 parts by weight.

Since the above-described polyrotaxane (A) according to the present invention may be compatible with silicones including the (B) first compound having a polysiloxane structure, the polyrotaxane (A) can be included at a higher concentration as described in the above range.

Further, since the (A) polyrotaxane can be included at a higher concentration as described in the above range, a crosslinked body according to the present invention may have desired properties such as a desired Young's modulus, a desired hysteresis loss, and/or a desired insulating property.

More, the invention can provide a substance comprising the above-described crosslinked body. The substance is not particularly limited as long as it comprises the above-described crosslinked body.

<<Method for Producing a Polyrotaxane Comprising a Long Chain Alkyl Group(s) and the Like in a Cyclic Molecule(s), According to the Present Invention>>

The polyrotaxane comprising a long chain alkyl group(s) and the like in a cyclic molecule(s), according to the present invention may be produced by following method:

The method may comprise the steps of:
(I) preparing a polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises (1) a hydroxyl group(s) or (2) a hydroxypropyl group(s);
(II) preparing a second compound, which is one selected from the group consisting of RCOOH, RCOCl and RNCO, wherein R has the definition same as described;
(III) reacting the polyrotaxane prepared in the step (I) and the second compound prepared in the step (II);
thereby to produce the polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s),
wherein the cyclic molecule comprises a first group represented by the above-described formula I.

<Step (I)>

The step (I) is a step of preparing a polyrotaxane, wherein the cyclic molecule comprises (1) a hydroxyl group(s) or (2) a hydroxypropyl group(s).

This step can be carried out by the method described in WO2008/10841.

In the step (I), the cyclic molecule may comprise the (1) hydroxyl group(s) and/or a hydroxyl group derived from the (2) hydroxypropyl group(s), and in a case where an amount of the hydroxyl group(s) is 100%, 20 to 80%, preferably 25 to 75%, more preferably 30 to 70%, most preferably 40 to 60% of the hydroxyl group(s) may be substituted with the first group(s) in the polyrotaxane obtained after the step (III).

<Step (II)>

The step (II) is a step of preparing a second compound, which is one selected from the group consisting of RCOOH, RCOCl, and RNCO, wherein R has the same definition as described above.

Examples of RCOOH may include, but are not limited to, lauryl acid, myristic acid, palmitic acid, oleic acid or the like.

Further, examples of RCOCl may include, but are not limited to, lauryl acid chloride, myristic acid chloride, palmitic acid chloride, oleic acid chloride or the like.

More, examples of RNCO may include, but are not limited to, dodecyl isocyanate, tetradecyl isocyanate, octadecyl isocyanate or the like.

Furthermore, the second compound may be commercially available or may be produced separately.

<Step (III)>

The step (III) is a step of reacting the polyrotaxane prepared in step (I) with the second compound prepared in step (II).

Specifically, the reaction may be carried out under the conditions such as a temperature: room temperature to 150° C. and a pressure: normal pressure.

The above method may include a step(s) other than the above steps (I) to (III).

Examples of the step other than steps (I) to (III) may include, but are not limited to, a step of removing a solvent.

<Method for Producing a Crosslinked Body Comprised of the Polyrotaxane According to the Present Invention>

The present invention also provides a method for producing a crosslinked body comprised of the polyrotaxane according to the present invention, in particular, a crosslinked body comprised of a composition comprising the polyrotaxane according to the present invention; and (B) a first compound.

The method may comprise the steps of:

(X) preparing a (A) polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises a first group represented by the above-described formula I;

(XI) preparing a (B) first compound comprising a polysiloxane structure;

(XII) reacting the (A) polyrotaxane and the (B) first compound, for example, under the conditions of:
temperature: from room temperature to 150; pressure: normal pressure;
thereby to produce a crosslinked body comprised of the (A) polyrotaxane; and the (B) first compound.

<<Step (X)>>

The step (X) is a step of preparing a polyrotaxane (A) in which the cyclic molecule(s) has the first group represented by the above formula I. The step may use the above-mentioned method for producing a "polyrotaxane in which a cyclic molecule(s) has a first group represented by the above formula I".

<<Step (XI)>>

The step (XI) is a step of preparing a (B) first compound having a polysiloxane structure. Those described above can be used as (B) the first compound having a polysiloxane structure, and the first compound may be commercially available or prepared separately.

<<Step (XII)>>

The step (XII) is a step of reacting (A) the polyrotaxane with (B) the first compound.

Reaction conditions may include, but are not limited to, a temperature at from room temperature to 150° C. in the presence or absence of a solvent.

The above method may include a step(s) other than the above steps (X) to (XII).

Examples of the step other than the above steps (X) to (XII) may include, but are not limited to, a step of mixing C1, C2 and other component(s), or a step of removing a solvent.

The polyrotaxane according to the present invention, the composition comprising the polyrotaxane, and the body comprising the polyrotaxane can apply to various application because of the characteristics thereof. Examples of the application may include, but are not limited to, electrical and electronic component materials, electrical insulation materials for use of actuator, pressure-sensitive adhesives and adhesives, materials for use of sensors, scratch-resistant films, anti-vibration, damping, and isolation materials, sound absorbing materials, paints, coating agents, sealants, ink additives and binders, binders for use of metals and/or metal oxides, binders for use of abrasives, optical materials, friction control agents, cosmetic materials, rubber additives, foam materials, resin modifying and toughening agents, compatibilizers for resins, electrolyte materials, rheology control agents, thickeners, fibers, medical biomaterials, cosmetic materials, mechanical and automotive materials, building materials, and clothing and sporting goods, and the like.

Hereinafter, the present invention will be described in more detail by using, but not limited to, following examples.

EXAMPLES

Analytical Device for Each Compound

The $^1$H-NMR measurement was determined by 400 MHz JEOL JNM-AL400 (manufactured by JEOL Ltd.).

The measurement of the molecular weight and the molecular weight distribution was carried out by using TOSOH HLC-8220 GPC instrument. The measurement was carried out under the conditions: column: TSK guard column Super AW-H and TSKgel Super AWM-H (two columns are linked); elution solution: dimethylsulfoxide (DMSO)/0.01 M LiBr; column oven: 50° C.; flow rate: 0.5 ml/min; sample concentration of about 0.2 wt/vol %; injection amount: 20 µl; pre-treatment: filtration using a 0.2 µm filter; and the standard molecular weight: PEO.

The measurement of the hydroxyl value and the acid value was determined by the method according to JIS 0070-1992.

Synthesis Example 1: Synthesis of Polyrotaxane Modified with Hydroxypropyl Group, HAPR The polyrotaxane formed from linear molecule: polyethylene glycol (number average molecular weight, Mn: 20,000); cyclic molecule: α-cyclodextrin; capping groups: adamantane groups, and the polyrotaxane, wherein the above-described polyrotaxane was modified with hydroxypropyl group (HAPR) were prepared according to a manner described in WO2008/108411.

The weight average molecular weight Mw of the obtained HAPR determined by GPC was 129,000. Further, the NMR determination revealed that 50% of the hydroxyl groups in cyclodextrin were substituted with hydroxypropyl groups. The measurement of the hydroxyl value resulted in 398 mgKOH/g.

Synthesis Example 2: Preparation of Crosslinker PPG-B

Into a reaction flask, 91.6 g of 1,3-bis(isocyanate methyl) cyclohexane (TAKENATE 600, manufactured by Mitsui Chemicals, Inc.) was added. Then, the resultant was stirred in an oil bath at 80° C. under a nitrogen stream. To the solution, 100 g of polypropylene glycol of diol type (Mn=700) was added dropwise over 2 h. The resulting mixture was further stirred for 2 h. After the reaction, the temperature was lowered to room temperature. Subsequently, 76.6 g of 2-butanone oxime (manufactured by TOKYO CHEMICAL INDUSTRY, CO., LTD.) was added dropwise. The mixture was then stirred at room temperature for 8 h to prepare polypropylene glycol having a blocked isocyanate group, the end of which was blocked with butanone oxime (crosslinker PPG-B).

Synthesis Example 3: Preparation of Crosslinker Solution PDMS-g-PCL-B

Into a three-necked recovery flask, 100 g of both-terminal carbinol-modified polydimethylsiloxane (X-22-160AS, manufactured by Shin-Etsu Chemical Co., Ltd.) and 200 g of ε-caprolactone (manufactured by Daicel Corporation) were added. The mixture was stirred for 2 h in an oil bath at 110° C. under a nitrogen stream for dehydration. Then, the temperature of the oil bath was raised to 130° C. Next, 0.1 g of tin 2-ethylhexanoate (manufactured by Aldrich, Inc.) was added and stirred for 6 h, to prepare a polycaprolactone-polydimethylsiloxane block copolymer with polycaprolactone grafted at both ends.

Into another three-necked recovery flask, 31.6 g of 1,3-bis(isocyanate methyl) cyclohexane (TAKENATE 600, manufactured by Mitsui Chemicals, Inc.) was added, and the resultant was then stirred in an oil bath at 90° C. under a nitrogen stream. To this solution, a solution of 152.7 g of the above polydimethylsiloxane in which polycaprolactone was grafted at both ends in 152.7 g of toluene was slowly added dropwise over 2 h. The resulting mixture was then further stirred for 2 h. After the reaction, the liquid temperature was lowered to room temperature, and 22.9 g of 2-butanone oxime (manufactured by TOKYO CHEMICAL INDUSTRY, CO., LTD.) was slowly added dropwise so that the liquid temperature did not become 60° C. or higher. After the dropwise addition, the mixture was stirred at room temperature for 5 h, to prepare PDMS-g-PCL-B, a crosslinker solution (concentration: 57.6 wt %) containing polydimethylsiloxane (PDMS) having a terminally blocked isocyanate group.

Example 1: Preparation of Modified Polyrotaxane A1

Into a reactor, 10 g of HAPR obtained in Synthesis Example 1 and 40 ml of dimethylacetamide were added and dissolved, and 6 ml of triethylamine was further added with stirring. Then, 9.6 ml of myristic acid chloride was slowly added dropwise while the reaction vessel was cooled with water. The reaction was then continued for 15 h. The resulting solution was reprecipitated in water. The resulting solid was washed with water several times, and then dried under reduced pressure in a dryer at 80° C., to produce a modified polyrotaxane A1 having cyclic molecules α-CDs with a myristic acid ester group.

GPC analysis resulted in the weight average molecular weight: 174,000. Measurement of the hydroxyl value resulted in 133 mgKOH/g.

Example 2: Preparation of Composition Comprising Modified Polyrotaxane A1 and Polysiloxane Into a sample bottle, 1.90 g of polydimethylsiloxane (PDMS) having hydroxyl groups at both ends, namely X-22-160AS (manufactured by Shin-Etsu Chemical Co., Ltd.) and 0.10 g of the modified polyrotaxane A1 obtained in Example 1 were placed. The mixture was stirred with a magnetic stirrer, to obtain a transparent, insoluble matter-free composition.

The composition of the present Example consisted of the modified polyrotaxane A1, which is a polyrotaxane according to the present invention, and polydimethylsiloxane, to provide a composition having 5 wt % of the modified polyrotaxane A1 in a case where the total weight of the modified polyrotaxane A1 and the polydimethylsiloxane is set to 100 wt %.

Comparative Example 1: Solubility of Hydroxypropylated Polyrotaxane SH2400P Comprising Polycaprolactone Chain in Polysiloxane A solubility experiment, which is similar to Example 2, was carried out, by using a hydroxypropylated polyrotaxane SH2400P comprising polycaprolactone chain (manufactured by ASM Inc.). The experiment using 1.90 g of polydimethylsiloxane (PDMS) X-22-160AS (manufactured by Shin-Etsu Chemical Co., Ltd.) and 0.10 g of SH2400P resulted in an insoluble matter, not to obtain a homogeneous composition.

Furthermore, SH2400P has the following structure, in which OH groups of the cyclic molecules: α-CDs of polyrotaxane formed from a linear molecule: polyethylene glycol (number average molecular weight Mn=20,000), cyclic molecules: α-CDs, and capping groups: adamantan groups are substituted with a hydroxypropyl group(s) and an OH group(s) of the hydroxypropyl group(s) is further substituted with a polycaprolactone chain(s) (the hydroxyl value: 76 mgKOH/g).

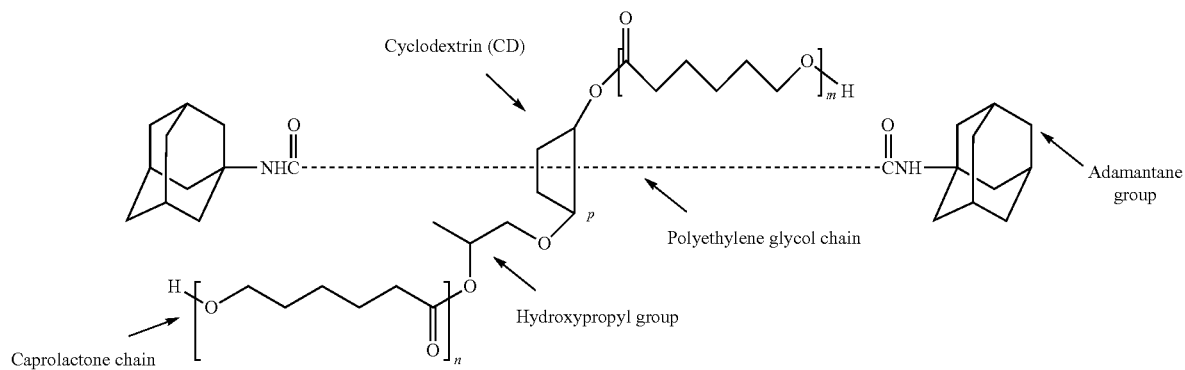

Comparative Example 2: Preparation of HAPR Having Butylcarbamoyl Group and Solubility Thereof in Polysiloxane Into a reactor, 10 g of the HAPR obtained in Synthesis Example 1 was added, and dissolved in 40 ml of dimethylacetamide. Then, 4 ml of butyl isocyanate was added dropwise under nitrogen flow conditions, and the mixture was reacted for 15 h. The reaction solution was reprecipitated in isopropanol (IPA). The resulting solid was washed twice with IPA and dried at 80° C., to give a butylcarbamoyl-modified polyrotaxane (PR-X1).

The NMR determination revealed that 51% of the hydroxyl group in the CDs were substituted with the butylcarbamoyl group. The GPC determination revealed that weight average molecular weight was 165,000.

An experiment similar to that of Example 2 was carried out using PR-X1. A solubility experiment using 1.90 g of polydimethylsiloxane (PDMS) X-22-160AS (manufactured by Shin-Etsu Chemical Co., Ltd.) and 0.10 g of PR-X1 resulted in an insoluble matter, not to obtain a homogeneous composition.

Comparative Example 3: Preparation of HAPR Comprising Cyclohexylcarbamoyl Group and Solubility Thereof in Polysiloxane Experiment was carried out in a manner similar to Comparative Example 2 except that 4.5 ml of cyclohexyl isocyanate was used instead of 4 ml of butyl isocyanate. As a result, a cyclohexylcarbamoyl-modified polyrotaxane (PR-X2) was obtained.

The NMR determination revealed that 48% of the hydroxyl group in the CDs were substituted with the cyclohexylcarbamoyl group. The GPC determination revealed that weight average molecular weight was 172,000.

An experiment similar to Example 2 was carried out using PR-X2. A solubility experiment using 1.90 g of polydimethylsiloxane (PDMS) X-22-160AS (manufactured by Shin-Etsu Chemical Co., Ltd.) and 0.10 g of PR-X2 resulted in an insoluble matter, not to obtain a homogeneous composition.

Example 3: Preparation of Composition B1 Comprising Modified Polyrotaxane A1 and Polysiloxane; and Preparation of Film C1 from the Composition B1

<Preparation of Composition B1>

The modified polyrotaxane A1 of Example 1 was used to produce a composition B1 having the components described in following Table 1. In Table 1, the antioxidant Thanox 1726 manufactured by Rianlon Corp was used. (the same was used in the following Examples).

Furthermore, in the composition B1, the amount of the crosslinker PPG-B was adjusted such that the total amount of hydroxyl groups of the modified polyrotaxane A1, polypropylene glycol, and the polydimethylsiloxane (PDMS) X-22-160AS was equivalent to the amount of isocyanate groups in the crosslinker PPG-B.

When the total weight of the modified polyrotaxane A1 and the polydimethylsiloxane (PDMS) X-22-160AS in the composition B1 was set to 100 wt %, the amount (wt %) of the modified polyrotaxane A1 was 64.5 wt % among the 100 wt %.

<Preparation of Film C1>

The above composition B1 was applied onto a release agent-treated PET sheet so that the film thickness was 50 μm, and the resulting material was cured at 80° C. for 1 h, followed by 130° C. for 5 h. A transparent film C1 was obtained by peeling it off from the PET sheet.

Furthermore, when the total weight of the modified polyrotaxane A1 and the polydimethylsiloxane (PDMS) X-22-160AS in the film C1 was set to 100 wt %, the amount (wt %) of the modified polyrotaxane A1 was 64.5 wt % among the 100 wt %, which was the same as the wt % in the composition B1. Further, the percentage of the weight (wt %) based on the polydimethylsiloxane (PDMS) structure with respect to the total weight of the film C1 was measured in the film C1, to be 15.5 wt %.

TABLE 1

| Components of the composition B1 | |
|---|---|
| Modified polyrotaxane A1 | 0.60 g |
| Polypropyleneglycol (Diol, Mw = 700) | 0.25 g |
| X-22-160AS (PDMS) | 0.33 g |
| PPG-B | 1.26 g |
| Toluene | 2.43 g |
| Dibutyltin dilaurate | 1.0 mg |
| Antioxidant Thanox 1726 (Made by Rianlon Corp.) | 42 mg |

Example 4: Preparation of Composition B2 Comprising Modified Polyrotaxane A1 and Polysiloxane; and Preparation of Film C2 from the Composition B2

<Preparation of Composition B2>

The modified polyrotaxane A1 of Example 1 was used to produce a composition B2 having the components described in following Table 2. Furthermore, the composition B2 was a polypropylene glycol-free system when compared with the above composition B1. In the composition B2, the amount of the crosslinker PPG-B was adjusted such that the total amount of hydroxyl groups of the modified polyrotaxane A1 and the polydimethylsiloxane (PDMS) X-22-160AS was equivalent to the amount of isocyanate groups in the crosslinker PPG-B.

When the total weight of the modified polyrotaxane A1 and the polydimethylsiloxane (PDMS) X-22-160AS in the composition B2 was set to 100 wt %, the amount (wt %) of the modified polyrotaxane A1 was 47.6 wt % among the 100 wt %.

<Preparation of Film C2>

The procedure similar to Example 3 was carried out except that the composition B1 in Example 3 was replaced with the composition B2, to prepare a transparent film C2.

Furthermore, when the total weight of the modified polyrotaxane A1 and the polydimethylsiloxane (PDMS) X-22-160AS in the film C2 was set to 100 wt %, the amount (wt %) of the modified polyrotaxane A1 was 47.6 wt % among the 100 wt %, which was the same as the wt % in the composition B2. Further, the percentage of the weight (wt %) based on the polydimethylsiloxane (PDMS) structure with respect to the total weight of the film C2 was measured in the film C2, to be 29.7 wt %.

TABLE 2

| Components of the composition B2 | |
|---|---|
| Modified polyrotaxane A1 | 0.60 g |
| X-22-160AS (PDMS) | 0.66 g |
| PPG-B | 1.26 g |
| Toluene | 2.52 g |
| Dibutyltin dilaurate | 1.0 mg |
| Thanox 1726 | 44 mg |

Comparative Example 4: Preparation of Composition B3 Comprising Polyrotaxane SH2400P and Polysiloxane; and Preparation of Film C3

<Composition B3>

Hydroxypropylated polyrotaxane SH2400P comprising polycaprolactone chain as used in Comparative Example 1 was used to produce a composition B3 having the components described in following Table 3. The polydimethylsiloxane (PDMS) X-22-160AS used in Examples 3 and 4 is not compatible with SH2400P as demonstrated in Comparative Example 1. Thus, instead of the polydimethylsiloxane (PDMS) X-22-160AS, the crosslinker solution PDMS-g-PCL-B prepared in Synthesis Example 3 was used.

<Film C3>

The procedure similar to Example 3 was carried out except that the composition B1 in Example 3 was replaced with the composition B3, to produce a transparent film C3. Furthermore, the percentage of the weight (wt %) based on the polydimethylsiloxane (PDMS) structure with respect to the total weight of the film C3 was measured in the film C3, to be 5.2 wt %.

TABLE 3

| Components of the composition B3 | |
|---|---|
| SH2400P | 1.0 g |
| Polypropyleneglycol (Diol, Mw = 700) | 0.47 g |
| PDMS-g-PCL-B | 1.06 g |
| PPG-B | 0.90 g |
| Toluene | 2.53 g |
| Dibutyltin dilaurate | 1.5 mg |
| Thanox 1726 | 60 mg |

Example 5: Tensile Properties and Withstand Voltage of Film

<Tensile Test>

The tensile test for each film was conducted and measured by a Shimadzu Autograph AGS-5kNX. The film was cut into a dumbbell-shaped No. 7 type according to JIS K-6251. The effective tensile length was set to 20 mm and the tensile rate was set to 100 mm/min. The Young's modulus was calculated from the stress and displacement (elongation) curve. In addition, the hysteresis loss was also calculated by repeatedly pulling at the same speed and constant elongation and then loosening (according to JIS K6400). In the stress-strain curve, the hysteresis loss was calculated by {(the area of curve when pulled−the area when loosened)/the area when pulled}×100%.

<Test for Measuring Withstanding Voltage>

The dielectric breakdown electric field of each film produced was measured under normal temperature and pressure according to JIS 8703. The cured film was attached to a disk electrode on the installation side, another disk electrode was placed on the film, and a vacuum device was used for degassing so that there were no air bubbles between the film and each electrode. The electrodes were connected to a power supply for a dielectric breakdown measuring instrument, and a voltage was applied at a voltage elevation rate of 10 V/0.1 s. The measurement was conducted from the no-current flowing state to the dielectric breakdown electric field (V/μm).

The films C1 to C3 obtained in Example 3, Example 4, and Comparative Example 4 were used in the above-described tests to measure the tensile properties (specifically, a Young's modulus and a hysteresis loss) and the withstand voltage. The results are shown in Table 4.

Table 4 showed that any of the film C1 or C2 using the modified polyrotaxane according to the present invention showed a small average leakage current and exhibited a high insulating property. Also, the films C1 and C2 each have a low Young's modulus. Thus, the films C1 and C2 using the modified polyrotaxane according to the present invention are each found to have a lower Young's modulus and a higher insulating property. On the other hand, the film C3 without using the modified polyrotaxane according to the present invention is found to have a Young's modulus comparable to that of the film C1 or C2, but has a relatively large average leakage current, and does not exhibit insulating properties.

TABLE 4

| Characteristics of each film | | | |
|---|---|---|---|
| Characteristics | Film C1 | Film C2 | Film C3 |
| Young's modulus (MPa) | 3.6 | 3.5 | 3.2 |
| Hysteresis loss (%) | 2.7 | 2.7 | 0.8 |
| Average leakage current (μA) @500 V | 0 | 0 | 0 |
| @1000 V | 0 | 0 | 2 |
| @2000 V | 1 | 1 | 10 |
| @3000 V | 2 | 2 | 14 |
| @4000 V | 4 | 4 | 15 |
| @5000 V | 6 | 6 | — |

What is claimed is:

1. A polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s),
wherein the cyclic molecule comprises a first group represented by following formula I,
wherein X represents a single bond or NH;
n represents 1;
R represents a linear, branched or cyclic alkyl group, alkenyl group or alkynyl group having 12 to 20 carbon atoms wherein a part of hydrogens in the alkyl group, alkenyl group or alkynyl group may be substituted with an OH group(s), a CN group(s) or an $NH_2$ group(s); and
* represents the position bound to the cyclic molecule,

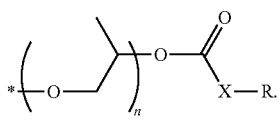

2. The polyrotaxane according to claim 1, wherein the cyclic molecule comprises a hydroxyl group(s), and a part of the hydroxyl group(s) is (are) substituted with the first group(s), wherein 20 to 80% of the hydroxyl group(s) are substituted with the first group(s) in a case where an amount of the hydroxyl group(s) before substitution is 100%.

3. The polyrotaxane according to claim 1, wherein the polyrotaxane comprises a hydroxyl group(s), and the polyrotaxane has a hydroxyl value of 60 to 300 mgKOH/g.

4. A composition comprising:
(A) the polyrotaxane according to claim 1; and
(B) a first compound comprising a polysiloxane structure.

5. The composition according to claim 4, wherein in a case where the total weight of the (A) polyrotaxane and the (B) first compound is 100 parts by weight, the (A) polyrotaxane has 3 to 70 parts by weight in the 100 parts by weight.

6. The composition according to claim 4, wherein the (B) first compound comprises a hydroxyl group.

7. The composition according to claim 4, wherein the (B) first compound comprises a polydimethylsiloxane structure.

8. A crosslinked body formed from the composition according to claim 4.

9. A substance comprising the crosslinked body according to claim 8.

10. A method for producing a polyrotaxane comprising the steps of:

(I) preparing a polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule is directly bound to (2) a hydroxypropyl group(s);

(II) preparing a second compound, which is one selected from the group consisting of RCOOH, RCOCl and RNCO, wherein R represents a linear, branched or cyclic alkyl group, alkenyl group or alkynyl group having 12 to 20 carbon atoms wherein a part of hydrogens in the alkyl group, alkenyl group or alkynyl group may be substituted with an OH group(s), a CN group(s) or an $NH_2$ group(s);

(III) reacting the polyrotaxane prepared in the step (I) and the second compound prepared in the step (II);

thereby to produce the polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s),
wherein the cyclic molecule comprises a first group represented by following formula I,
wherein X represents a single bond or NH;
n represents 1;
R represents a linear, branched or cyclic alkyl group, alkenyl group or alkynyl group having 12 to 20 carbon atoms wherein a part of hydrogens in the alkyl group, alkenyl group or alkynyl group may be substituted with an OH group(s), a CN group(s) or an $NH_2$ group(s); and
* represents the position bound to the cyclic molecule,

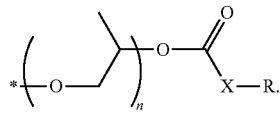

11. The method according to claim 10, wherein the cyclic molecule in the step (I) comprises the (1) hydroxyl group(s) and/or a hydroxyl group derived from the (2) hydroxypropyl group(s), and in a case where an amount of the hydroxyl group(s) is 100%, 20 to 80% of the hydroxyl group(s) are substituted with the first group(s) in the polyrotaxane obtained after the step (III).

12. A method for producing a cured body comprising the steps of:
(X) preparing a (A) polyrotaxane comprising capping groups each locating at each end of a pseudopolyrotaxane, which has a linear molecule and a cyclic molecule(s) in which the linear molecule is included in a cavity (cavities) of the cyclic molecule(s) in a skewered manner, in order to prevent the dissociation of the cyclic molecule(s), wherein the cyclic molecule comprises a first group represented by following formula I,
wherein X represents a single bond or NH;
n represents 1;
R represents a linear, branched or cyclic alkyl group, alkenyl group or alkynyl group having 12 to 20 carbon atoms wherein a part of hydrogens in the alkyl group, alkenyl group or alkynyl group may be substituted with an OH group(s), a CN group(s) or an NH$_2$ group(s); and
* represents the position bound to the cyclic molecule,

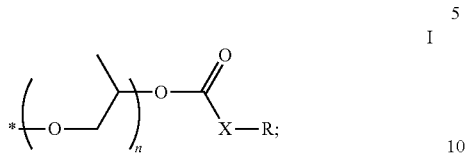

(XI) preparing a (B) first compound comprising a polysiloxane structure;
(XII) reacting the (A) polyrotaxane and the (B) first compound;
thereby to produce the cured body comprised of the (A) polyrotaxane; and the (B) first compound.

* * * * *